United States Patent
Nishimura

[11] 3,940,862
[45] Mar. 2, 1976

[54] SAILING SIMULATOR

[75] Inventor: Kaoru Nishimura, Kyoto, Japan

[73] Assignee: Shimadzu Seisakusho Ltd., Kyoto, Japan

[22] Filed: Sept. 24, 1974

[21] Appl. No.: 508,801

[30] Foreign Application Priority Data
Oct. 3, 1973  Japan.............................. 48-111667
Oct. 3, 1973  Japan.............................. 48-111668

[52] U.S. Cl. .................................................... 35/11
[51] Int. Cl.² ........................................... G09B 9/06
[58] Field of Search ................ 35/11 R, 11 A, 12 P

[56] References Cited
UNITED STATES PATENTS

| | | |
|---|---|---|
| 2,208,083 | 7/1940 | Rousseau ................................. 35/11 |
| 2,855,702 | 10/1958 | Taylor..................................... 35/11 |
| 3,305,943 | 2/1967 | Hansen ................................... 35/11 |
| 3,471,943 | 10/1969 | Waddington et al. ................... 35/11 |
| 3,529,354 | 9/1970 | Roberts et al. ....................... 35/12 P |
| 3,531,875 | 10/1970 | Waddington et al. ................... 35/11 |
| 3,540,134 | 11/1970 | Waddington et al. ................... 35/11 |

*Primary Examiner*—Wm. H. Grieb
*Attorney, Agent, or Firm*—Fidelman, Wolffe & Waldron

[57] ABSTRACT

A sailing simulator comprising: a hull provided with a boom and a rudder; first supporting means for supporting the hull through the intermediary of springs for heeling motion; second supporting means for supporting the first supporting means for rotation about a vertical axis; and drive means for causing the first and second supporting means to effect heeling motion and rotation, respectively; and means operable in response to the handling of the boom and/or the rudder to control the drive means. An elastic means is interposed between the first supporting means and the drive means therefor so that the hull can be moved about the heeling axis by positional change of the weight of the trainee on the hull. Means is also provided for application of a reactive force to the boom as the boom and/or the rudder are handled.

11 Claims, 6 Drawing Figures

SAILING SIMULATOR

The invention relates to a sailing simulator and more particularly to an apparatus for training beginners in the art of handling a sailboat or yacht.

For a beginner to learn the technics of sailing a yacht, it has been customary that the trainee together with a skilled person or trainer gets on board a yacht actually sailing on water. However, such training on actual water is always accompanined by some danger, and weather conditions suitable for training beginners cannot always be encountered.

Recently there have been proposed various types of trainers or simulators which enable learning of the sailing technics on dry land or indoors. In some of them, however, the hull of a model boat is fixed on a base, so that it is impossible to acquire a sensitivity a yachtsman must have to changes in the draft of the boat due to the weight of the crews and the heeling of the boat due to changes in the position of each crew or the conditions of the sail, and to learn elementary sailing techincs to balance the heeling by changing the position of his weight on the yacht.

Accordingly, one object of the invention is to provide an apparatus which enables a beginner to learn the sailing technics as if he were actually sailing a yacht on water. The apparatus comprises a model sailboat the hull of which is elastically supported so that it draws deep or light, heels and pitches as if it were actually on water.

In order to maneuver the sailboat properely on actual water it is necessary to acquire higher technics such as tacking and jibing. In the training apparatus it is therefore highly desirable to be able to learn such higher sailing technics through having as realistic feeling or senses as possible to the reaction of the boom to the wind, its sudden movement from one side to the other of the boat, and the reaction of water to the rudder, and through training of setting the boom angle and handling the tiller in proper relation to the direction of the wind and the heading of the boat. None of the known devices have been successful in training the student with such realistic feelings as would be experienced on actual water when the yacht runs, quarters, tacks, or jibes.

Another object of the invention is therefore to provide an apparatus for training the student in various sailing technics such as running, quartering, reaching, tacking, jibing, etc., or combinations thereof as realistically as if the yacht were on actual water.

The invention will be clearly understood by reading the following detailed description of preferred embodiments thereof with reference to the accompanying drawings wherein.

Figure 1:
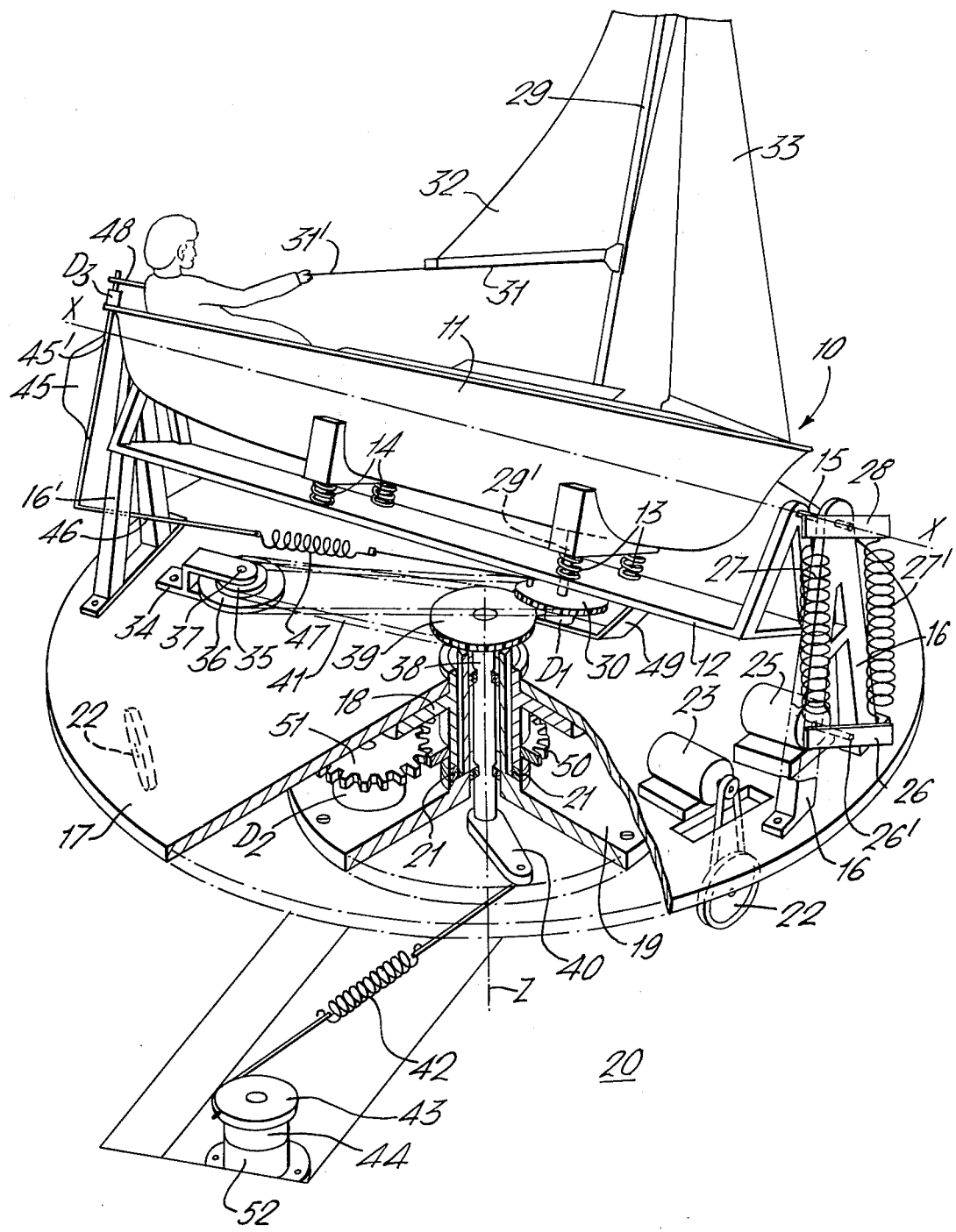
FIG. 1 is a schematic perspective view, partly in vertical section, of one embodiment of the invention.
Figure 2:
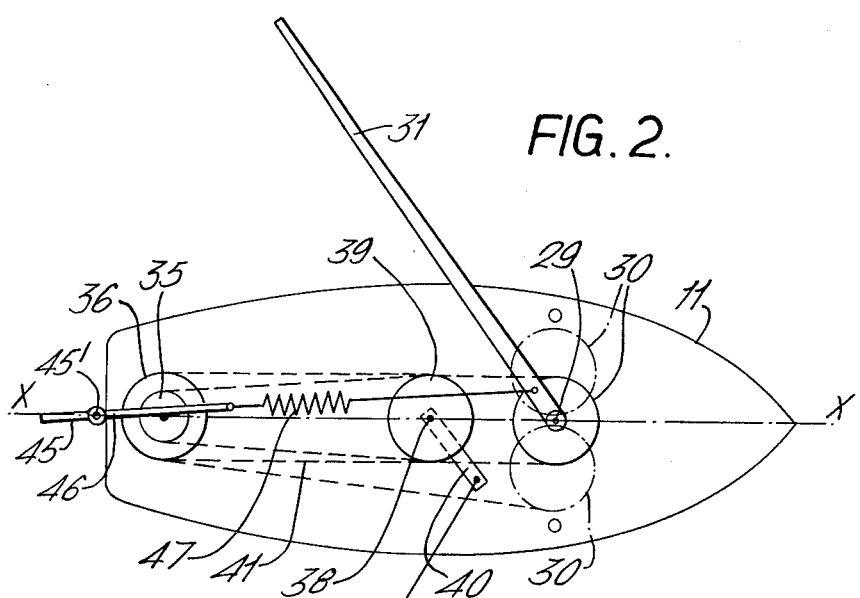
FIG. 2 is a simplified top plan view of the apparatus shown in FIG. 1.

Referring now to FIGS. 1 and 2, there is shown a sailboat or yacht generally designated by 10 and comprising a hull 11 which is supported by a heeling frame 12 through the intermediary of two pairs of coil springs 13 and 14. Due to the springs when a person gets in the boat the hull moves up and down and tilts to either side relative to the frame 12.

The frame 12 is pivoted at the opposite ends of the length thereof by a pin 15 to the upper ends of a pair of brackets 16 and 16' in such a manner that the frame 12 is swingable about a horizontal axis X passing the metacenter of the hull. The brackets 16 and 16' have their respective lower ends fixed to a rotatable member in the form of a turntable 17 at the diametrically opposite positions thereof. The turntable is provided at its central portion with a depending tube 18 which is supported on a base 19 secured to the ground or floor 20 through a suitable bearing 21 so that the table is freely rotatable about a vertical axis Z passing the metacenter of the hull.

The turntable is supported on the ground or floor by means of a plurality, say, three rollers only two of which are shown at 22. A servomotor (yawing servomotor) 23 is rigidly mounted on the turntable and when controlled as described later, rotates one of the rollers 22 through a belt 24 thereby to turn the table 17 about the vertical axis Z.

Another servomotor (heeling servomotor) 25 is rigidly mounted on the turntable and when energized as described later, turns an arms 26 about its midpoint 26' in either direction. A pair of coil springs 27, 27' connect the opposite ends of the arm 26 to the corresponding ends of an upper arm 28 fixed to the pivot pin 15. When the motor 25 is energized as described later, the arm 26 and consequently the arm 28 are turned so that the frame 12 is swung about the axis X thereby heeling the hull 11 to either side. Springs 27, 27' allow arm 28 to be at a different angular position than arm 26 due to the position of the crew in the hull.

A mast 29 stands vertically on the hull, with its lower extension 29' projecting downwardly through the bottom of the hull and the frame 12. A sprocket wheel 30 is secured to the lower end of the extension for the purpose to be described presently. A boom 31 is secured to the mast at a predetermined height so as to be turned simultaneously with the mast. A main sail 32 and a jib sail 33 are provided.

A bracket 34 secured to the upper surface of the turntable 17 supports a pair of pulleys 35 and 36 which are individually rotatable about a common shaft 37. A vertical shaft 38 is rotatable about the previously mentioned vertical axis Z. A sprocket wheel 39 is secured to the upper end of the shaft 38, to the lower end of which a crank arm 40 is fixed. A single endless chain 41 is provided between the sprocket wheels 30 and 39 passing about the two pulleys 35 and 36. The two sprocket wheels are of the same diameter so that one of them rotates for the same angle as the other.

As shown in FIG. 2 the crank arm 40 is dispalced 180 degrees from the boom 31. A coil spring 42 has its one end attached to the outer end of the crank arm and its other end fixed to drum 43. With this arrangement, if the boom is tightened against the wind blowing in the direction of the arrow Wd in FIG. 2, that is, rotated counterclockwise about the main mast, the crank arm 40 is turned counterclockwise about the shaft 38 against the force of the spring 42. This means that as the boom is moved windward, the reaction of the spring 42 to the boom and consequently to the hand holding a mainsheet 31' connected to the boom increases. On the contrary, if it is moved leeward, that is, turned clockwise, the load on the hand decreases. Thus, it is possible to impose a proper load on the hand handling the boom in accordance with the angle the boom makes with the direction of the wind without being affected by the turning, heeling or pitching of the hull.

It should be noted that when the boat heels so that the mast is inclined from its vertical position, the transmission of rotation through the chain-and-sprocket connection 30, 31, 35, 36, 41 is not affected. In FIG. 2 the sprocket 30 is shown in dot-and-dash lines as the boat heels. Thus, it is possible for a student to learn as realistically as if he were on water the behavior of the boom or sail, such as that as the yacht tacks from the position shown in FIG. 2, the boom comes to be directed completely leeward, whereupon no load is on the sail so that it is difficult to change the position of the boom or sail from one to the other side of the hull; and that as the yacht jibes, the boom comes to be directed windward, whereupon a large load is suddenly impressed on the sail when the boom is turned from one to the other side of the hull.

A geared motor 44 is provided to rotate the drum 43 thereby changing the initial tension of the spring 42 so as to produce a similar effect to that produced when the strength of the wind has changed.

A rudder 45 is provided at its lower end with a lever 46, between which and the sprocket wheel 30 there is provided a tension spring 47. When the rudder is operated by means of a tiller 48, the spring 47 applies to the boom 31 a load in addition to the load provided by the spring 42, thereby giving a realistic feeling similar to that experienced on actual water as the heading of the yacht is changed by handling the rudder.

A first detector D1 for detection the angle $a$ which the boom makes with the longitudinal axis of the hull is supported by a bracket 49 fixed to the heeling frame 12 below the lower end of the extension 29' of the mast 29 in axial alignment therewith. As the boom 31 is moved, the main mast 29 to which the boom is fixed is turned about its axis so that the angle of rotation, that is, the boom angle $a$ is detected by the detector D1.

A second detector D2 is mounted on the base 19 for detecting the angle $b$ which the longitudinal axis of the hull makes with the direction of the wind. The direction of the wind is supposed to be fixed in the illustrated embodiments. The detector D2 is connected through gears 50 and 51 meshing with each other to the depending tube 18 of the turntable 17 for detection of the rotational angle of the turntable, that is, the hulll angle $b$.

A third detector D3 is mounted on the shaft 45' of the rudder 45 so as to detect the rotational angle $c$ thereof, that is, the rudder angle.

A controller 52 is provided to apply a signal to energize the motor 44 to rotate the drum 43 thereby adjusting the initial tension of the spring 42 to a desired value. The assembly comprising the drum 43, the motor 44 and the controller 52 is fixed to the ground or floor 20.

Figure 3:
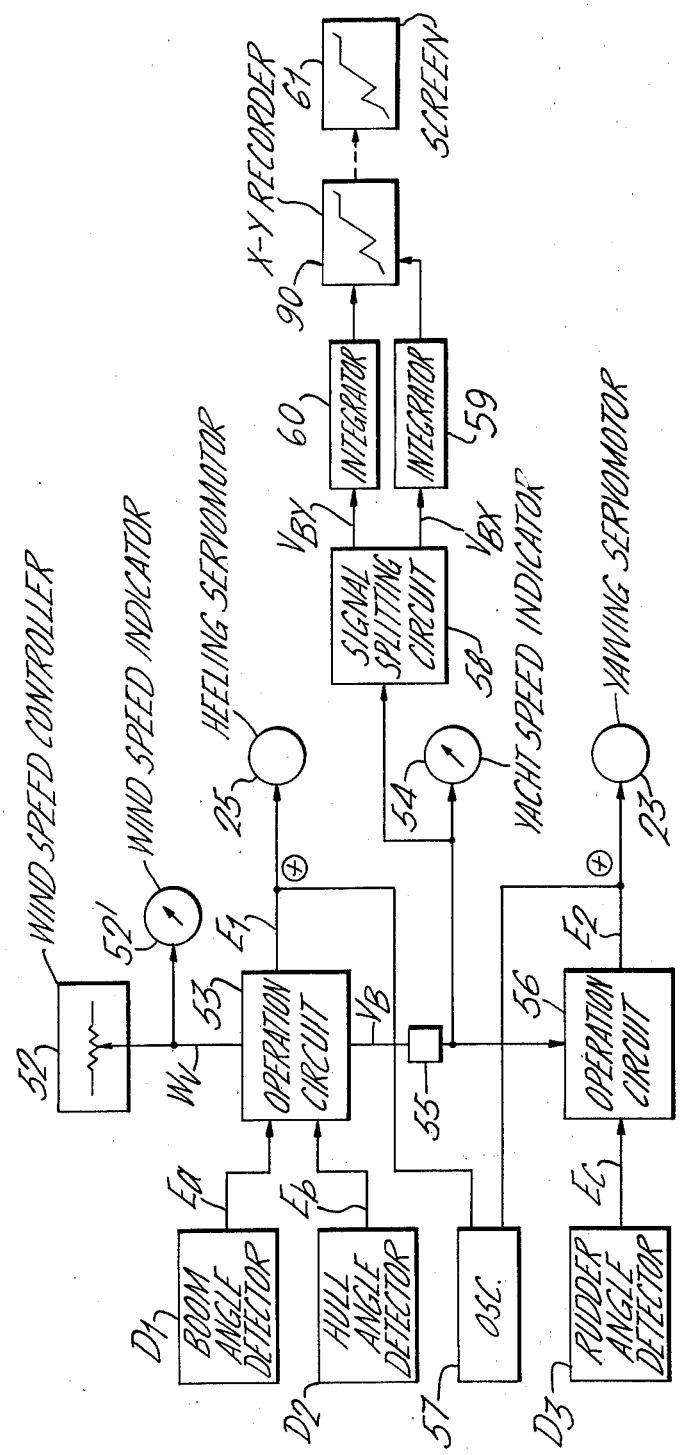
FIG. 3 is a block diagram of a control circuit of the apparatus of the invention.

Turning to FIG. 3 which shows an electrical circuit to control the above described mechanism, suppose that the output signals from the detectors D1, D2 and D3 and the controller 52 are $E_a$, $E_b$, $E_c$ and $W_v$, respectively. The signals $E_a$, $E_b$ and $W_v$ are applied to a first operation circuit 53, which produces a heeling signal E1 and a sailing speed signal $V_B$ in accordance with the following equations (1) and (2).

$$E1 = K1 \sin(b - a) \cos a \quad \quad 1$$

$$V_B = K2 \sin(b - a) \sin a \quad \quad 2$$

wherein $K1$ and $K2$ are constants. The heeling signal $E1$ is applied to the heeling servomotor 25 to effect a corresponding heeling motion of the hull.

The output signal $V_B$ is applied to a yacht speed indicator 54 through a circuit 55 which gives a lag having an appropriate time constant. An indicator 52' may be connected to the output of the wind speed controller 52 so as to indicate the speed of the wind.

The output signal $E_c$ from the rudder angle detector D3 is applied to a second operation circuit 56, to which the speed signal $V_B$ is also applied through the circuit 55, so that the circuit 56 conductes calculations in accordance with the following equation (3) and produces a yawing signal E2 to be applied to the yawing servomotr 23 which rotates the turntable 17 through a corresponding angle thereby causing the yacht to yaw.

$$E2 = K3 \, V_B \sin c \quad \quad 3$$

wherein $K3$ is a constant.

Thus, in response to the operation of the trainee, that is, the rudder angle, the boom angle and the heading of the boat relative to the direction of the wind, the hull heels and/or changes its heading as if it actually were sailing on water.

An oscillator 57 may be added so as to provide a pulsating output to be superimposed on the outputs E1 and E2 from the circuits 53 and 56 to be applied to the servomotors 25 and 23, respectively. These superimposed signals cause the hull to repeatedly slightly heel and change its heading to and fro at a predetermined cycle. This gives the trainee a feeling similar to that he would have on the actual sea when the waves cause the boat to pitch, roll or drift.

An X-Y recorder 90 may also be provided for recording the wake of the yacht. To this end, the speed signal $V_B$ is split by a signal splitting circuit 58 into two signals $V_{BX}$ and $V_{BY}$ corresponding to the speeds of the yacht along the X- and Y-axis, respectively. The signals $V_{BX}$ and $V_{BY}$ are applied through integrators 59 and 60 as the X and Y inputs to the recorder 90, which indicates the wake of the yacht the trainee is handling, so that his skill can be judged by the record.

The record of the X-Y recorder may be projected on a screen 61 so that even during the course of training the trainee can see how he is handling the sail and the rudder.

Figure 4:
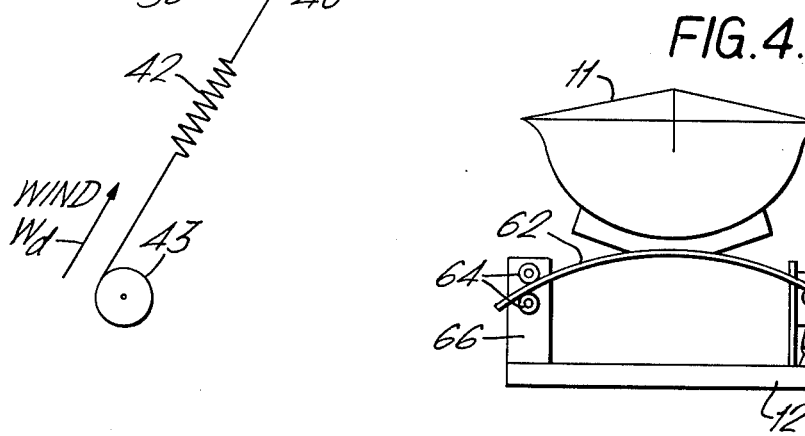
FIG. 4 is a front view showing a different method of elastically supporting the hull of the sailboat shown in FIG. 1.

In the embodiment of FIG. 1, the hull is resiliently supported on the heeling frame 12 through the coil springs 13 and 14. The coil springs may be replaced by a leaf spring 62 as shown in FIG. 4. Let it be assumed that the spring 62 supports the bow of the hull 11. Another similar leaf spring not shown supports the stern of the hull. The spring 62 at the bow has its one end fixed to a slide 63 and the other end supported between a pair of rollers 64. The slide is vertically slidable in a guide member 65 mounted on the heeling frame 12, and the rollers 64 are supported by a block 66 mounted on the frame. A geared motor 67 mounted on the heeling frame has fixed to the output shaft thereof an eccentric cam 68 which is in contact with the bottom surface of the slide 63. It will be easily seen that as the cam 68 is rotated, the slide 63 with the end of the leaf spring 62 moves up and down, thereby giving the hull a pitching motion combined with a slight rolling motion similar to those caused by the waves on the actual sea.

If a similar eccentric cam is placed below the hull shown in FIG. 1, the same effect as in FIG. 4 can be obtained in the arrangement of FIG. 1.

With the mechanism shown in FIG. 1 for applying a reactive force or load to the boom 31 when it is operated, the magnitude of the force applied to the boom is constant regardless of the angle which the longitudinal axis of the hull makes with the direction of the wind, provided that the angle which the boom makes with the direction of the wind remains unchanged. Experience shows, however, that when the boat advances windward the force acting on the boom is of a magnitude different from when it runs leeward despite that the angle of the boom relative to the wind is the same.

Figure 5:
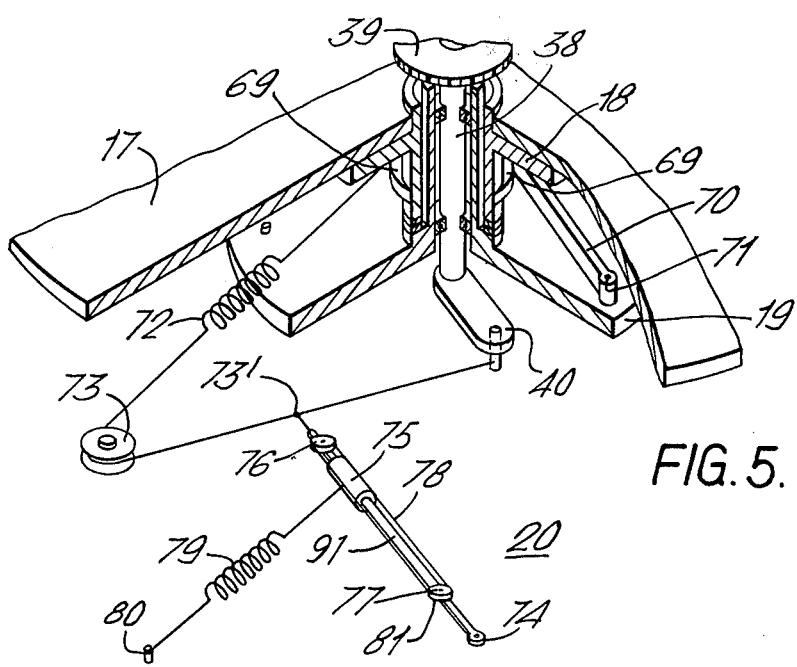
FIG. 5 is a schematic perspective view, partly in vertical section, of a portion of another embodiment of the invention.
Figure 6:
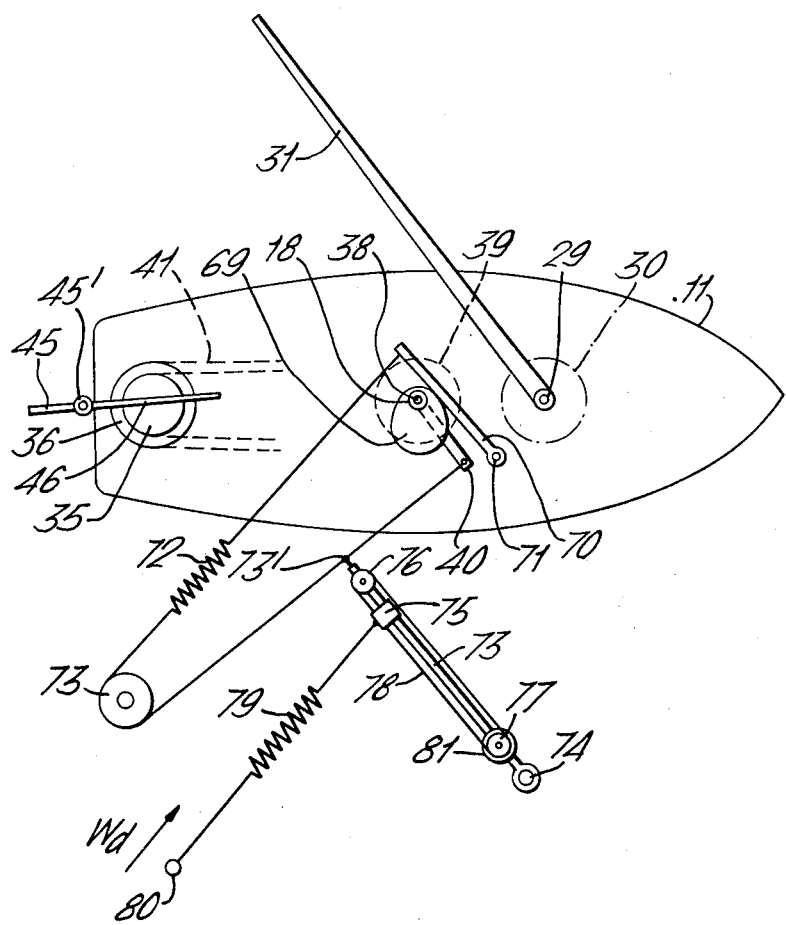
FIG. 6 is a view similar to FIG. 2 but showing the embodiment of FIG. 5.

FIGS. 5 and 6 show an arrangement which enables application of a proper reactive force or load to the boom in accordance with the angle of the longitudinal axis of the hull relative to the direction of the wind, that is, the angle of the hull as well as the angle of the boom relative to the direction of the wind. In FIGS. 5 and 6 the same reference numerals and symbols as in FIGS. 1 and 2 denote corresponding parts and in FIG. 5 the gears 51 and 50 and the detector D2 in FIG. 1 are not shown for simplicity of illustration. An eccentric cam 69 is fixed to the depending tube 18 of the turntable 17. A lever 70 is pivoted by a pin 71 to the base member 19. A coil spring 72 has its one end fixed to the other free end of the lever 70 and passes about a pulley 73 and has its other end fixed to the crank arm 40 fixed to the vertical shaft 38. The spring 72 urges the lever 70 into contact with the circumferential surface of the cam 69.

Another lever 91 has its one end pivoted by a pin 74 to the ground 20 and its other end fixed to the spring 72 as at 73'. The lever 73 has a slider ring 75 axially slidable thereon and a pair of sprocket wheels 76 and 77 at the opposite ends thereof. An endless chain 78 connects the sprocket wheels 76 and 77 and is fixed to the slider ring 75. A spring 79 corresponding to the spring 42 in FIG. 1 has its one end fixed to the slider 75 and its opposite end anchored to the ground at 80.

When the boom 31 is turned in either direction about the mast 29, a reactive force is applied to the boom by the action of the spring 79 in accordance with the angle of the boom relative to the direction of the wind. Then as the turntable 17 and the hull 11 thereon is turned, the cam 69 is rotated thereby to cause the lever 70 to swing about the pivot pin 71. This changes the force of the spring 72 which acts on the boom together with the force of the spring 79. In other words, a proper load is applied on the boom in accordance with the angle of the hull relative to the direction of the wind, that is, the angle of rotation of the hull as well as the angle of the boom relative to the direction of the wind, so that the trainee can have a realistic feeling as if he were on the actual sea.

It is known that even with the same angle of the boom relative to the direction of the wind, a larger force acts on the boom when the boat runs leeward than when it advances windward. Therefore, the cam 69 is so contoured that as the hull is turned from windward to leeward, the tension of the spring 72 increases, and the cam 69 and the lever 70 are attached to the turntable 17 and the base 19, respectively, in such a manner as to satisfy the above relation.

The force applied to the lever 40 by the spring 79 can be changed by energizing a geared motor 81 to rotate the sprocket wheel 77 thereby displacing the slider 75 axially of the lever 91. This change of the spring force is equivalent to the change of the wind speed.

1. Sailing simulator comprising: a hull provided with a boom for handling a sail and a rudder; first supporting means, first elastic means interposed between said hull and said first supporting means for resiliently mounting said hull to said first supporting means, second supporting means for supporting said first supporting means so that said first supporting means is swingable about the longitudinal axis of said hull, said second supporting means being rotatable about a vertical axis; drive means for causing said first supporting means to swing about said longitudinal axis and said second supporting means to rotate about said vertical axis; and second elastic means interconnecting said first supporting means and said drive means for summing the driving force from the drive means to swing said first supporting means and the force produced by the weight and position of a crew.

2. The apparatus of claim 1, wherein said first elastic means comprises coil springs.

3. The apparatus of claim 1, wherein said first elastic means comprises leaf springs.

4. The apparatus of claim 1, further including means for periodically moving said hull relative to said first supporting means thereby to give said hull a pitching motion.

5. The apparatus of claim 1, further including means for biasing said boom so that as said boom is rotated about a mast in a predetermined direction, a reactive force acting on said boom increases, while as said boom is rotated in the opposite direction, said force decreases.

6. The apparatus of claim 5, further including means operable in response to the handling of said rudder to apply an additional force on said boom.

7. The apparatus of claim 5, wherein said biasing means comprises a crank arm which is rotatable about said vertical axis and displaced 180° from said boom; means for applying a force to said crank arm to rotate the same about said vertical axis, and means for effecting transmission of rotation between the axes of rotation of said crank arm and said boom in such a manner that said transmission of rotation is unaffected by heeling motion of said hull.

8. The apparatus of claim 7, wherein said force applying means comprises a spring having one end connected to said crank arm and means connected to the other end of said spring for changing the initial tension of said spring.

9. The apparatus of claim 7, wherein said force applying means comprises elastic means operatively connected to said crank arm, and means for changing the characteristics of said elastic means in accordance with said longitudinal axis of said hull relative to the direction of the wind.

10. The apparatus of claim 7, wherein said force applying means comprises a first spring operatively connected to said crank arm; means for changing the characteristics of said first spring; a second spring operatively connected to said crank arm; and means operable in response to the rotation of said second supporting means to change the force of said second spring to be applied to said crank arm.

11. The apparatus of claim 1 wherein said second elastic means includes a first arm connected to said drive means, a second arm connected to said first support means, and a pair of springs interconnecting corresponding ends of said first and second arms so as to allow said arms to assume a non-parallel relationship.

* * * * *